United States Patent
Gluck

(10) Patent No.: US 7,227,847 B2
(45) Date of Patent: Jun. 5, 2007

(54) POWER MANAGEMENT SYSTEM AND METHOD FOR A WIRELESS COMMUNICATIONS DEVICE

(75) Inventor: Amir Gluck, Tel Aviv (IL)

(73) Assignee: IXI Mobile (R&D) Ltd., Ra'anana (IL)

( * ) Notice: Subject to any disclaimer, the term of this patent is extended or adjusted under 35 U.S.C. 154(b) by 71 days.

(21) Appl. No.: 10/800,381

(22) Filed: Mar. 11, 2004

(65) Prior Publication Data

US 2005/0201291 A1 Sep. 15, 2005

(51) Int. Cl.
*G08C 17/00* (2006.01)
(52) U.S. Cl. .................... 370/311; 455/574
(58) Field of Classification Search ............... None
See application file for complete search history.

(56) References Cited

OTHER PUBLICATIONS

Gauthier et al, Reducing Power Consumption for the Next Generation of PDAs: It's in the Network Interface?, downloadable at http://citeseer.ist.psu.edu/10096.html, pp. 1-32, 1996.*
Lorch et al, Software Strategies for Portable Computer Energy Management, IEEE, p. 60-75, 1998.*
Kravets et al, Power Management Techniques for Mobile Communications, ACM, pp. 157-168, 1998.*
Feeney et al, Investigating the Energy Consumption of a Wireless Network Interface in an Ad Hoc Networking Environment, IEEE, pp. 1548-1557, 2001.*

* cited by examiner

*Primary Examiner*—Frank Duong
(74) *Attorney, Agent, or Firm*—F. Jason Far-hadian, Esq.; Century IP Groups, Inc.

(57) ABSTRACT

An application based power management system comprises a power management application executed on a first device, wherein the power management application monitors communications interfaces for a plurality of applications in communication with one or more devices in a wireless environment, such that the power management application determines bandwidth and latency characteristics for each of the plurality of applications, and determines respective power management settings for each of the corresponding plurality of applications, wherein each respective power management setting optimizes data communicated by each of the applications in accordance with the corresponding bandwidth and latency characteristics.

20 Claims, 3 Drawing Sheets

POWER MANAGEMENT SYSTEM AND METHOD FOR A WIRELESS COMMUNICATIONS DEVICE

BACKGROUND

1. Field of Invention

The present invention relates generally to a power management system and method for a wireless communications device and, more particularly, to controlling power consumption associated with data communicated between a first device and a second device communicating in a wireless environment.

COPYRIGHT & TRADEMARK NOTICES

A portion of the disclosure of this patent document contains material, which is subject to copyright protection. The owner has no objection to the facsimile reproduction by any one of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is for providing an enabling disclosure by way of example and shall not be construed to limit the scope of this invention to material associated with such marks.

2. Related Art

Many devices that previously could only communicate by way of a wired connection (i.e., cable) are now able to do the same over a wireless connection. For example, wireless mice and keyboards are now commonly used instead of the more primitive versions that require such devices to be connected to a computing system by way of wire.

A limitation associated with wireless devices is that most wireless devices are typically battery operated. The life of the battery, generally, is directly related to the device usage and the frequency with which the device is used (e.g., the frequency with which data is communicated, or the volume of data communicated). Obviously, the battery life can be prolonged if device usage is minimized, and if data is communicated in a more efficient manner.

Certain currently available power management systems are implemented to limit data communications between a first device (e.g., a client device) and a second device (e.g., a server device) to predetermined time periods. That is, instead of constantly monitoring its communication interface to determine if data is ready for communication, a device is controlled by a power management system to wake up at predetermined intervals (e.g., "sniff periods") to communicate any pending data at that time.

Accordingly, data that becomes available in the duration of a sniff period is buffered and is collectively transferred at the end of the sniff period. This method allows a device to remain inactive during the sniff period and to only become active at the predetermined intervals. In the related art systems, some devices become active only in response to a trigger event, and remain active for a predetermined period without regard to the nature or volume of data communicated.

While the above-described power management methods reduce activation time and help save battery life, these methods are only useful when applied to unsophisticated devices (e.g., mice, keyboards, etc.) with predictable communication behaviors. Unfortunately, when the communication behavior is not predictable, the above methods fail to provide acceptable results.

For example, it is now possible for computing devices, such as personal computers and personal digital assistants, to wirelessly communicate with a remote network server to access the Internet or other resources attached to the wireless network. Said computing devices have more complex interface systems and execute software applications with specific communication requirements. Particularly, some applications (e.g., streaming applications such as audio/video players) require a minimum communication bandwidth and/or limited delay or latency in data communications to function properly. Furthermore, these particular requirements may change often or in specific intervals depending on the nature of the application or the specific task the application performs.

As such, the current power management methods implemented for simple interface devices cannot adequately address the above requirements. Further, most current systems and methods require a separate power management tool to be implemented for each wireless communication device or application. As a result, the related power management methods are device specific and do not provide a solution for actively managing bandwidth and latency requirements for various applications or processes that may be simultaneously executed on a single system.

Applying a single power management method to various applications may be counter effective, as each application's requirements differ from the other. Moreover, many of the current power management tools are not sophisticated enough to operate efficiently or alternatively require a user's fine-tuning to customize the power management tool for optimal performance.

A system and method is needed that can overcome the above shortcomings by providing a power management tool that can collectively manage the communication requirements of various wireless applications or devices.

SUMMARY

The present disclosure is directed to a power management system and corresponding methods for controlling power consumption associated with data communicated between a first device and a second device in a wireless area network.

For the purpose of summarizing, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested.

In accordance with one or more embodiments, a power management method for controlling data communicated by one or more applications executed on a first device communicating in a wireless communications network comprises monitoring data communicated by at least a first application executed on the first device, wherein the data is communicated over a wireless communication interface between the first device and a second device; determining first bandwidth and latency characteristics for the data communicated by at least the first application; determining a first power management setting for at least the first application, wherein the first power management setting optimizes data communications between the first device and the second device in accordance with the first bandwidth and latency characteristics; and automatically changing power management settings for at least the first application to the determined first power management setting, when the first application is communicating over the wireless communication interface.

In one embodiment, the step of monitoring data comprises monitoring header information for packets of information included in the data communicated by at least the first application, or monitoring content of the data communicated by at least the first application, or monitoring type of the data communicated by at least the first application, or monitoring bandwidth of the data communicated by at least the first application.

In another embodiment, the step of determining the first bandwidth and latency characteristics comprises determining bandwidth and latency associated with at least the first application based on a history of required bandwidth and latency for the first application, where said history is available from a first source. In yet another embodiment, the step of determining the first bandwidth and latency characteristics comprises determining bandwidth and latency associated with at least the first application based on the header information.

In one embodiment, the step of determining the first bandwidth and latency characteristics comprises determining bandwidth and latency associated with at least the first application based on the content of the data communicated by the first application, or determining bandwidth and latency associated with at least the first application based on the type of the data communicated by the first application, or determining bandwidth and latency associated with at least the first application based on a heuristic method, wherein the associated bandwidth and latency are adjusted over a time period based on results obtained from said adjustments over a predetermined time period.

In accordance with one embodiment, an application based power management system comprises a power management application executed on a first device, wherein the power management application monitors communications interfaces for a plurality of applications in communication with one or more devices in a wireless environment, such that the power management application determines bandwidth and latency characteristics for each of the plurality of applications, and determines respective power management settings for each of the corresponding plurality of applications, wherein each respective power management setting optimizes data communicated by each of the applications in accordance with the corresponding bandwidth and latency characteristics.

The power management application automatically changes power management settings for each application to the respective power management setting determined for each of the corresponding plurality of applications. In some embodiments, the power management application monitors header information for packets of information included in data communicated by each of the plurality of applications.

In one or more embodiments, the power management application monitors content of the data communicated by each of the plurality of applications. In yet other embodiments, the power management application monitors type of the data communicated by each of the plurality of applications. The power management application monitors bandwidth of the data communicated by each of the plurality of applications.

These and other embodiments of the present invention will also become readily apparent to those skilled in the art from the following detailed description of the embodiments having reference to the attached figures, the invention not being limited to any particular embodiments disclosed.

BRIEF DESCRIPTION OF THE DRAWINGS

Embodiments of the present invention are understood by referring to the figures in the attached drawings, as provided below.

Features, elements, and aspects of the invention that are referenced by the same numerals in different figures represent the same, equivalent, or similar features, elements, or aspects, in accordance with one or more embodiments.

DETAILED DESCRIPTION

A computing system and corresponding computer executable methods, according to an embodiment of the present invention, facilitate and provide a method for controlling communication and power management settings for devices that wirelessly communicate with one another, or with a server device in a communications network. This method may be implemented, in accordance with one embodiment, in a wireless personal area network (PAN) or other type of wireless network.

A PAN is, typically, a close range wireless network in which multiple devices can communicate with one another as soon as a device is situated within the proximate range of another device. The devices in the PAN are generally equipped with low-cost, low-power, short-range radio communication interfaces, supported by well-known wireless communication protocols.

Certain embodiments of the invention, by way of example, are described as applicable to a PAN implemented over Bluetooth or IEEE 802.11 wireless communication protocols and with respect to a client device in communication with a server device. These embodiments, however, are not to be construed as limiting the scope of the invention to said particular protocols or related systems. Other embodiments of the invention may be implemented over any type of communications network suitable to achieve the purposes of the invention, regardless of a certain device being designated as a "client" or a "server" device.

Numerous specific details are set forth to provide a thorough description of various embodiments of the invention. Certain embodiments of the invention may be practiced without these specific details or with some variations in detail. In some instances, features not pertinent to the novelty of the system are described in less detail so as not to obscure other aspects of the invention.

Figure 1:
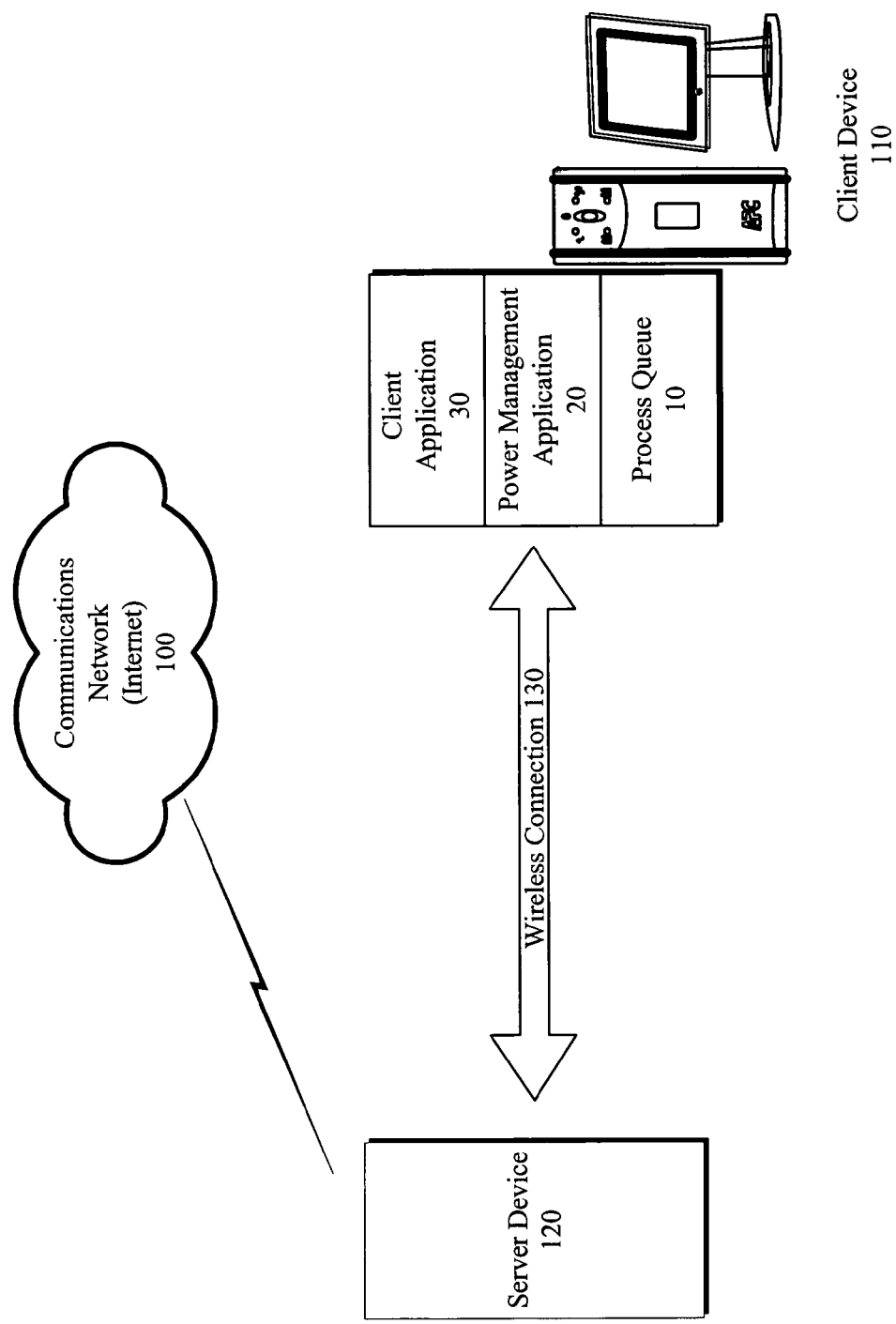
FIG. 1 illustrates an exemplary communication environment for a client device and a server device in a wireless communications environment, in accordance with one embodiment of the invention.

Referring to FIG. 1, in one or more embodiments of the present invention, a plurality of computing systems or devices (i.e., client device 110, server device 120, etc.) may be arranged in a wired or wireless communications network to receive and transfer information. In alternative embodiments, certain devices may be connected either wirelessly or by wire in a non-networked environment to communicate data (i.e., by way of a data cable).

In one embodiment, client device 110 and server device 120 may comprise one or more means of wireless communications, such as Bluetooth, IEEE 802.11, or infrared ports. Client device 110 or server device 120, by way of example, may be one of a mobile computing device, a personal digital assistance, a cellular phone, a laptop computer, a desktop computer or other device capable of data storage and data communication, for example, in a wireless communications network.

As provided earlier, the scope of the invention shall not be construed as limited to a client device in communication with a server system in a client/server networked environment. That is, devices 110 and 120 can be any two devices configurable for communicating with each other, for example. By way of example, however, in the following one or more embodiments of the invention are described as applicable to devices implemented in a client/server environment.

One or more wireless communication technologies suited for connecting wireless devices in short-range or long-range area networks and the like may be utilized, in certain embodiments, to connect client device 110 to server device 120, for example. The terms "connected," "coupled," or any variant thereof, mean any connection or coupling, either direct or indirect, between two or more elements. The coupling or connection between the elements can be physical, logical, or a combination thereof.

One of ordinary skill in the art will appreciate that a communications network implemented according to the present invention may advantageously be comprised of one or a combination of various types of networks without detracting from the scope of the invention. Such networks in addition to a PAN can, for example, comprise local area networks (LANs), wide area networks (WANs), public, private or secure networks, value-added networks, interactive television networks, two-way cable networks, satellite networks, interactive kiosk networks, cellular communications networks, personal mobile gateways (PMGs) and/or any other suitable communications network.

In certain embodiments, a power management application 20 is executed on client device 110, for example, to monitor data communications between client device 110 and server device 120 over wireless connection 130. In certain embodiments, power management application 20 is dedicated to monitoring and adjusting communications settings (i.e., bandwidth, latency, etc.) for each client application 30 running on client device 110.

In at least one embodiment, client device 110 is a Bluetooth enabled cellular mobile telephone, for example, that communicates with server device 120 in a short-range wireless network by way of a Bluetooth chipset, for example. In one embodiment, client device 110 is also capable of communicating with a base station by way of a modem chipset utilizing cellular communications technologies such as time division multiple access (TDMA), code division multiple access (CDMA), global systems for mobile communications (GSM), general packet radio service (GPRS), wideband CDMA (WCDMA) and other well-known wireless communications technologies.

Client device 110 may comprise a PMG device or communicate with a self-contained PMG device. The PMG architecture comprises a PMG server that can wirelessly communicate with a number of PMG enabled devices within the personal area of the user or a PAN. A more detailed description of the PMG architecture is provided in U.S. patent application Ser. No. 09/850,399, filed on May 7, 2001, the entire content of which is hereby incorporated by reference here.

As used herein, the terms mobile device, cellular phone and communications network are to be viewed as designations of one or more computing environments that comprise application, client or server software for servicing requests submitted by respective software applications included in devices or other computing systems connected thereto. These terms are not to be otherwise limiting in any manner. The power management application 20 and client applications 30, for example, may be comprised of one or more modules that execute on one or more integrated or distributed computing environments, as provided in further detail below.

Referring back to FIG. 1, in accordance with one embodiment, a plurality of client applications 30 are executed on client device 110 and communicate with server device 120 over wireless connection 130. Depending on system implementation, a process queue 10 or other suitable data structure is utilized to manage the order in which client applications 30 may communicate over wireless connection 130 with server device 120 or other devices (not shown).

For example, in embodiments of the invention where Bluetooth technology is used to implement wireless connection 130, a Bluetooth protocol stack makes up the core portion of the implementation. This stack enables client device 110 to locate server device 120 and to establish a wireless connection 130, through which client applications 30 can interact and exchange data with server device 120.

Meanwhile, as explained in further detail below, power management application 20 monitors traffic and application behavior to transparently allow for Bluetooth command and data to be communicated between the Bluetooth stack and each client application 30. In one embodiment, Bluetooth stack which implements the Bluetooth protocol receives power saving mode commands from power management application 20.

Figure 2:
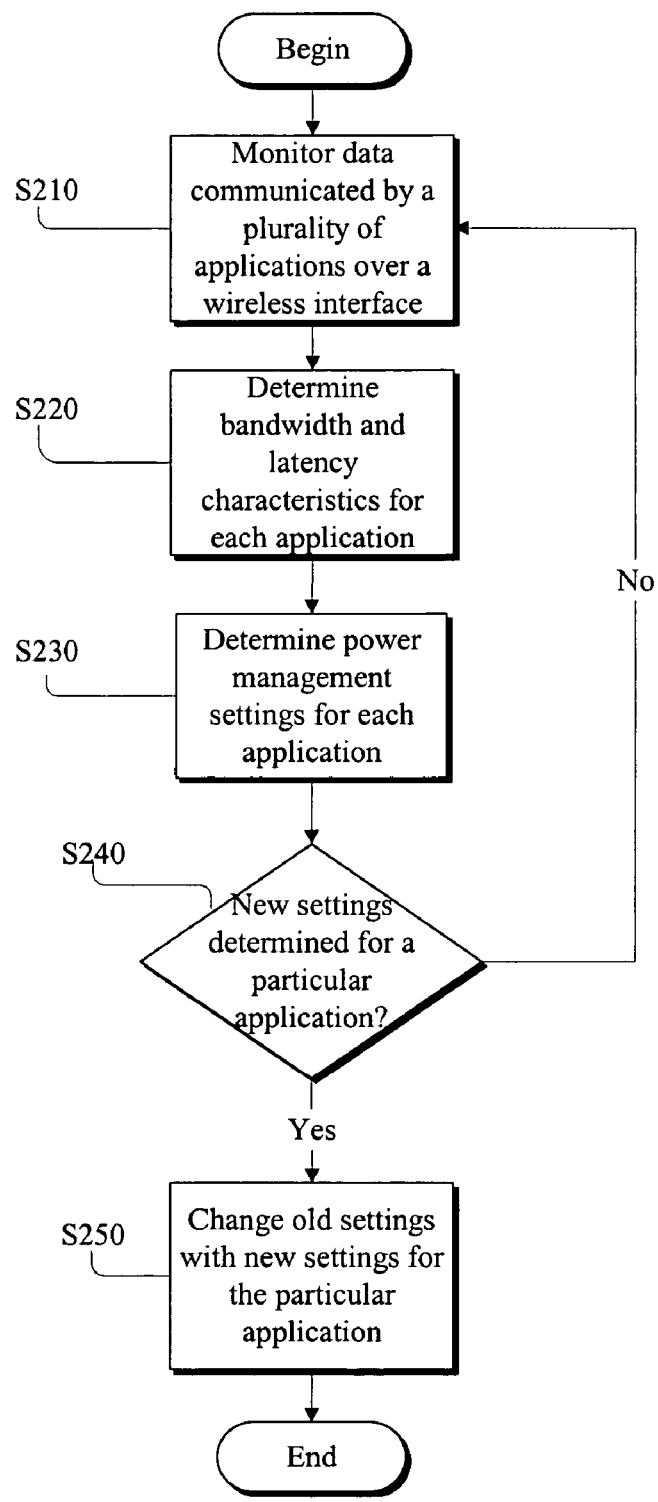
FIG. 2 is flow diagram of a power management method in accordance with one or more embodiments.

Referring to FIG. 2, in one embodiment, power management application 20 monitors data communicated by each of client applications 30 over wireless interface 130 (S210) in the context in which the data is communicated, as explained in further detail below. By monitoring the context and the nature of data communicated between client device 110 and server device 120, for each client application 30, certain bandwidth and latency characteristics are determined for each application 30 (S220).

Bandwidth as used herein refers to the transmission capacity of an electronic pathway such as a communications line established over the wireless connection 130. Bandwidth is generally measured based on number of bytes communicated per second over a digitally established communication line, whether wired or wireless. For example, the transmission capacity of a connection established by way of a dial-up modem is 56 Kilobits per second (Kbps), while that of a T1 line is 1.544 Mbps.

Latency, on the other hand, refers to the total time including any delay for transmitting data from a first point (e.g., client device 110) to a second point (e.g., server device 120). Delay in transmission can be due to the physical limitations associated with the transmission environment and retransmission requirements to recover lost data.

Referring back to FIG. 2, if a client application 30 is a media player application for communicating and playing audio or video data, for example, then power management application 20 may determine that the client application 30 requires high bandwidth and low latency. This is because audio/video files are typically large (e.g., over 1000 Kilobytes) and any delay or inefficiency in transmitting such volume of data can produce poor results during the replay of audio or video data, particularly in circumstances where the device replays the audio/video data as soon as it is received (e.g., streaming audio/video).

Alternatively, if the client application 30 is an email client used for receiving or transmitting text messages, for example, then the power management application 20 may determine that client application 30 can tolerate low bandwidth and high latency in data communications. This is because text messaging typically requires transmission of text files that are relatively small in size (e.g., less than 100 Kilobytes) where a longer rate of delay in transmission, in comparison with audio or video data, does not render the result unacceptable.

As another example, if the client application 30 is a graphic presentation application (e.g., a PowerPoint application, a web page browser, etc.), then the power management application may determine that a medium degree of latency and bandwidth can be tolerated, such that application 30 can cause an image to be displayed in a timely manner (e.g., within 2 seconds) without requiring the user to wait beyond a reasonable threshold in order to move from one graphic presentation to the next.

Table 1 represents several exemplary bandwidth/latency values as implemented in one or more embodiments of the invention, based on which a unique power management scheme may be assigned:

TABLE 1

|  | High Latency | Medium Latency | Low Latency |
| --- | --- | --- | --- |
| High Bandwidth | 1 | 2 | 3 |
| Medium Bandwidth | 4 | 5 | 6 |
| Low Bandwidth | 7 | 8 | 9 |

In one embodiment, in order to determine the latency and bandwidth characteristics and the corresponding power management scheme for each application, power management application 20 monitors the content of communicated data. Power management application 20 by examining the file extensions or the header information for the communicated data may determine that the data content includes audio, video, image, or text, for example, and based on the above table assign a value and/or determine bandwidth and latency requirements for client applications 30 involved in communicating such data.

In another embodiment, the latency or bandwidth characteristics may be determined based on the nature of client application 30. For example, if client application 30 is an audio player, then power management application 20 may determine that a high bandwidth and low latency (scheme #3) is the proper choice for client application 30, in order for it to operate efficiently. In other embodiments a combination of factors may be considered. For example, if client application 30 is a web browser with capabilities to communicate both image and text, then depending on the point in time in which text or graphic information is communicated, power management application 20 may determine different bandwidth or latency characteristics (e.g., schemes #4, #5, or #6) are proper for the particular client application 30.

It is noteworthy that the above exemplary situations and characteristic are provided to describe the invention with respect to particular embodiments. One skilled in the art would appreciate that alternative approaches may be followed and different factors may be considered in determining the latency, bandwidth, or other data characteristics that can be used to implement an efficient power management scheme. For example, in embodiments of the invention, a pure heuristic approach is implemented to randomly measure the bandwidth and latency requirements of a client application at various times, in order to determine an average or median value for the bandwidth and latency characteristics.

As such, in accordance with one embodiment, power management application 20 utilizes one or more of the above-mentioned methods to determine at least one power management setting for one or more client applications 30 (S230). For example, by monitoring the communication traffic bandwidth, content, and data header information for a web browser application power management application 20 may determine that bandwidth requirements for text communications reaches a peek at 8.30 a.m. as a user accesses a financial or news portal for related information, and that bandwidth and latency requirements for audio/video communications reaches a peek at 7.30 p.m. as a user, using client device 110, accesses streaming portals to listen to audio or watch video in the evening.

Accordingly, power management application 20 tracks various communication patterns to define a client application 30's communications requirements at one or more time intervals, and to determine at least one power management setting that is most suitable for that client application 30 at a particular time period. Thus, in the preceding example, power management application 20 may assign or apply a power management scheme that sets client device 110 resources to be available at a higher capacity during the hours of 7.30–9.30 a.m. (e.g., schemes #4, #5, or #6) and 6.30–8.30 p.m. (e.g., schemes #7, #8, or #9) when such resources are needed the most.

In some embodiments, a default setting is either provided by a client application 30 to power management application 20, or a default setting is determined for a client application 30 by power management application 20 at the onset, for example, based on a history of required bandwidth and latency characteristics for the respective client application 30. According to this embodiment, once power management application 20 determines a power management setting for a client application 30 (e.g., at step S230), power management application 20 then compares the setting with the default or a previously determined setting for that application. If new settings are determined (S240), that is, if the newly determined settings are different from the current (i.e., older) settings, then power management application 30 changes the older settings with the newer ones (S250).

In one or more embodiments of the invention, power management application 20 continuously monitors the settings for each client application 30 and if a new setting is determined the power management settings for the client applications 30 are updated. Otherwise, power management application 20 continues to monitor data communication activity for each client application 30 in accordance with one or more methods described above (S210).

By way of example, if an instant messaging client application 30 is executed on client device 110, power management application 20 first looks up the default or older value associated with latency and bandwidth requirements for the last instance of client application 30 that was executed on client device 110. This value may be, for example, stored in a look-up table saved in a storage medium (e.g., memory) of client device 110 or server device 120.

If the default or older value for the last instance is not found, then power management application 20 may query the instant messaging application or a related portal, for example, for such information. If that information is provided or is accessible from some resource, then power management application 20 will apply that value to set the power management requirements for the application. If that value is not available then power management application 20 sets an arbitrary value and starts monitoring various factors, such as context, nature, type and volume of the data communicated between client device 110 and server device 120 by the instant messaging client application 30.

Power management application 20 will then reduce or increase the bandwidth and latency values for the communicated data until results illustrate that a reasonable or acceptable data communication medium has been reached. The applied values are then updated as power management application 20 continues to monitor said various factors in order to ensure the most efficient power management setting for client application 30. As such, in one or more embodiments, power management application 20 allocates the required minimum or maximum bandwidth/latency for each application, respectively.

Where a first client application 30 does not require a high transmission bandwidth and can tolerate a relatively high latency, then the power management settings are adjusted by power management application 20 so that the client application 30 communicates information infrequently (i.e., long sleep periods) and in high transmission bursts (i.e., high bandwidth), by assigning scheme #1, for example.

If concurrent with the first client application a second client application is executed having high bandwidth and low latency requirements (e.g., audio/video application), then the first client application's setting are updated to communicate information using minimum bandwidth, but at a more frequent pace, for example, by assigning scheme #8 to the first application and scheme #3 to the second application. This method allocates a higher portion of the bandwidth to the second application with higher requirements, but at the same time allows the first application to communicate its data in a reasonable time.

In other embodiments, latency is adjusted based on a client application 30's requirement for submitting a response to a request. That is, the power management application 20 monitors correlations between incoming and outgoing data packets to determine if a certain incoming data always requires a response within a certain period. If so, then the latency for submitting a response is decreased to accommodate accordingly.

For example, if an instant messaging application receives a message, then it is expected that a response message would be transmitted within a short period of time. Thus, power management application 20 reduces the instant messaging application's latency for a predetermined time period after that application receives a message (e.g., scheme #9). After expiration of the predetermined time period, the probability of an outgoing message is substantially diminished. Therefore, power management application 20 increases the latency (e.g., scheme #7), for example.

In another embodiment, power management application 20 monitors input or output interfaces connected to client device 110 or server device 120. Thus, for example, if power management application 20 does not detect any user interaction with the interfaces, then it increases the latency (e.g. from scheme #9 to scheme #7). Otherwise, if user interaction is detected, latency is reduced and additional bandwidth is allocated to accommodate more efficient data communication (e.g., scheme #6).

In some embodiments, the control, monitoring and comparing functions discussed above in relation to power management application 20 are implemented in hardware, or a combination of hardware and software. As such, although power management application 20 is disclosed as applicable to the system of the present invention, this application is by way of example and shall not be construed to limit the scope of the invention to a software solution.

In embodiments of the system, client device 110 and server device 120 comprises a controlled system environment that can be presented largely in terms of hardware components and software code executed to perform processes that achieve the results contemplated by the system of the present invention. A more detailed description of such system environment is provided below with reference to FIGS. 3A and 3B.

As shown, a computing system environment is composed of two environments, a hardware environment 1110 and a software environment 1120. The hardware environment 1110 comprises the machinery and equipment that provide an execution environment for the software. The software provides the execution instructions for the hardware. It should be noted that certain hardware and software components may be interchangeably implemented in either form, in accordance with different embodiments of the invention.

Software environment 1120 is divided into two major classes comprising system software 1121 and control software 1122. System software 1121 comprises control programs, such as the operating system (OS) and information management systems that instruct the hardware how to function and process information. Control software 1122 is a program that performs a specific task, such as managing power consumption in a wireless network environment. As such, in one embodiment, power management application 20 is implemented in form of control software 1122. In certain embodiments of the invention, system and application software are implemented and executed on one or more hardware environments, for example.

Figure 3A:
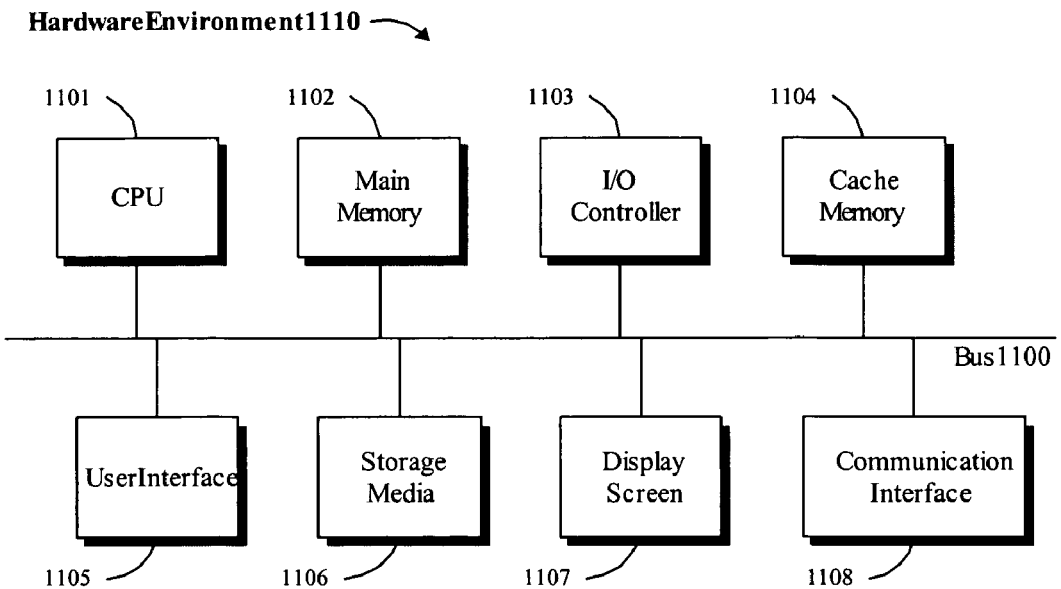
FIGS. 3A and 3B are block diagrams of hardware and software environments in which a system of the present invention may operate, in accordance with one or more embodiments.

Referring to FIG. 3A, an embodiment of the control software 1122 can be implemented as logic code in the form of computer readable code executed on a general purpose hardware environment 1110 that comprises a central processor unit (CPU) 1101, a main memory 1102, an input/output controller 1103, optional cache memory 1104, a user interface 1105 (e.g., keypad, pointing device, etc.), storage media 1106 (e.g., hard drive, memory, etc.), a display screen 1107, a communication interface 1108 (e.g., a wireless network card, a Blue tooth port, a wireless modem, etc.), and a system synchronizer (e.g., a clock, not shown in FIG. 3A).

Cache memory 1104 is utilized for storing frequently accessed information. A communication mechanism, such as a bi-directional data bus 1100, can be utilized to provide for means of communication between system components. Hardware Environment 1110 is capable of communicating with local or remote systems connected to a wireless communications network (e.g., a PAN or a WAN) through communication interface 1108.

In one or more embodiments, hardware environment 1110 may not include all the above components, or may include additional components for additional functionality or utility. For example, hardware environment 1110 can be a laptop computer or other portable computing device that can send messages and receive data through communication interface 1108. Hardware environment 1110 may also be embodied in an embedded system such as a set-top box, a personal data assistant (PDA), a wireless communication unit (e.g., cellular phone), or other similar hardware platforms that have information processing and/or data storage and communication capabilities. For example, in one or more embodiments of the system, hardware environment 1110 may comprise a PMG unit or an equivalent thereof.

In embodiments of the system, communication interface 1108 can send and receive electrical, electromagnetic, or optical signals that carry digital data streams representing various types of information including program code. If communication is established via a communications network, hardware environment 1110 may transmit program code through the network connection. The program code can be executed by central processor unit 1101 or stored in storage media 1106 or other non-volatile storage for later execution.

Program code may be transmitted via a carrier wave or may be embodied in any other form of computer program product. A computer program product comprises a medium configured to store or transport computer readable code or a medium in which computer readable code may be embedded. Some examples of computer program products are memory cards, CD-ROM disks, ROM cards, floppy disks, magnetic tapes, computer hard drives, and network server systems.

In one or more embodiments of the invention, processor 1101 is a microprocessor manufactured by Motorola, Intel, or Sun Microsystems Corporations, for example. The named processors are for the purpose of example only. Any other suitable microprocessor, microcontroller, or microcomputer may be utilized.

Figure 3B:
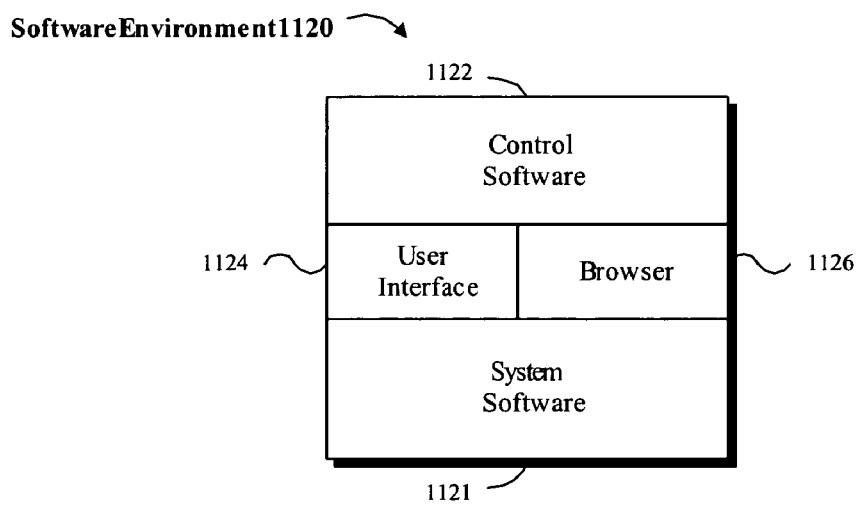

Referring to FIG. 3B, software 1120 or one or more of its components is stored in storage media 1106 and is loaded into memory 1102 prior to execution. Software environment 1120 comprises system software 1121 and control software 1122. Depending on system implementation, certain aspects of software environment 1120, and particularly control software 1122, can be loaded on one or more hardware environments 1110, or subcomponents thereof.

System software 1121 comprises software such as an operating system that controls the low-level operations of hardware environment 1110. Low-level operations comprise the management of the system resources such as memory allocation, file swapping, and other core computing tasks. In one or more embodiments of the invention, the operating system can be Nucleus, Microsoft Windows, Macintosh OS, or Linux. However, any other suitable operating system may be utilized.

Control software 1122 can comprise one or more computer programs that are executed on top of system software 1121 after being loaded from storage media 1106 into memory 1102. In a client-server architecture, control software 1122 may comprise client software and/or server software. Referring to FIG. 1, for example, in one embodiment of the invention, client software is executed on client device 110 and server software is executed on server device 120.

Software environment 1120 may also comprise web browser software 1126 for accessing content on a remote server. Further, software environment 1120 may comprise user interface software 1124 (e.g., a Graphical User Interface (GUI)) for receiving user commands and data. The received commands and data are processed by the software applications that run on the hardware environment 1110. The hardware and software architectures and environments described above are for purposes of example only. Embodiments of the invention may be implemented in any type of system architecture or processing environment.

Embodiments of the invention are described by way of example as applicable to systems and corresponding methods for managing power consumption in a battery operated device communicating in a wireless network environment. In this exemplary embodiment, logic code for performing these methods is implemented in the form of, for example, control software 1122 (i.e., power management application 20). The logic code, in one embodiment, may be comprised of one or more modules that execute on one or more processors in a distributed or non-distributed communication model. For example, one or more embodiments of the present invention may comprise separate radio and baseband modules, or alternatively modules incorporating the radio, baseband, micro-controller and flash memory in a single-chip solution.

It should also be understood that the programs, modules, processes, methods, and the like, described herein are but exemplary implementations and are not related, or limited, to any particular computer, apparatus, or computer programming language. Rather, various types of general-purpose computing machines or customized devices may be used with logic code implemented in accordance with the teachings provided, herein. Further, the order in which the methods of the present invention are performed is purely illustrative in nature. These methods can be performed in any order or in parallel, unless indicated otherwise in the present disclosure.

The methods of the present invention may be performed in either hardware, software, or any combination thereof. In particular, some methods may be carried out by software, firmware, or macrocode operating on a single computer a plurality of computers. Furthermore, such software may be transmitted in the form of a computer signal embodied in a carrier wave, and through communication networks by way of Internet portals or websites, for example. Accordingly, the present invention is not limited to any particular platform, unless specifically stated otherwise in the present disclosure.

The present invention has been described above with reference to preferred embodiments. However, those skilled in the art will recognize that changes and modifications may be made in these preferred embodiments without departing from the scope of the present invention. Other system architectures, platforms, and implementations that can support various aspects of the invention may be utilized without departing from the essential characteristics as described herein. These and various other adaptations and combinations of features of the embodiments disclosed are within the scope of the invention. The invention is defined by the claims and their full scope of equivalents.

The invention claimed is:

1. A power management method for controlling data communicated by one or more applications executed on a first device communicating in a wireless communications network, the method comprising:

monitoring data communicated by at least a first application executed on the first device, wherein the data is communicated over a wireless communication interface between the first device and a second device;

determining first bandwidth and latency characteristics for the data communicated by at least the first application;

determining a first power management setting for at least the first application, wherein the first power management setting optimizes data communications between the first device and the second device in accordance with the first bandwidth and latency characteristics; and automatically changing power management settings for at least the first application to the determined first power management setting, when the first application is communicating over the wireless communication interface.

2. The power management method of claim 1, wherein the step of monitoring data comprises:

monitoring header information for packets of information included in the data communicated by at least the first application.

3. The power management method of claim 1, wherein in the step of monitoring data comprises:

monitoring content of the data communicated by at least the first application.

4. The power management method of claim 1, wherein in the step of monitoring data comprises:

monitoring type of the data communicated by at least the first application.

5. The power management method of claim 1, wherein in the step of monitoring data comprises:

monitoring bandwidth of the data communicated by at least the first application.

6. The power management method of claim 1, wherein the step of determining the first bandwidth and latency characteristics comprises:

determining bandwidth and latency associated with at least the first application based on a history of required bandwidth and latency for the first application, where said history is available from a first source.

7. The power management method of claim 2, wherein the step of determining the first bandwidth and latency characteristics comprises:

determining bandwidth and latency associated with at least the first application based on the header information.

8. The power management method of claim 3, wherein the step of determining the first bandwidth and latency characteristics comprises:

determining bandwidth and latency associated with at least the first application based on the content of the data communicated by the first application.

9. The power management method of claim 4, wherein the step of determining the first bandwidth and latency characteristics comprises:

determining bandwidth and latency associated with at least the first application based on the type of the data communicated by the first application.

10. The power management method of claim 1, wherein the step of determining the first bandwidth and characteristics comprises:

determining bandwidth and latency associated with at least the first application based on a heuristic method, wherein the associated bandwidth and latency are adjusted over one or more time periods based on results obtained from said adjustments over a predetermined time period.

11. An application based power management system comprising:

a power management application executed on a first device, wherein the power management application monitors communications interfaces for a plurality of applications in communication with one or more devices in a wireless environment, such that the power management application determines bandwidth and latency characteristics for each of the plurality of applications, and determines respective power management settings for each of the plurality of applications, wherein each respective power management setting optimizes data communicated by each of the applications in accordance with the corresponding bandwidth and latency characteristics.

12. The power management system of claim 11, wherein the power management application automatically changes an older power management setting for an application with a respective power management setting determined for the application, if the respective power management setting is different than the older power management setting.

13. The power management system of claim 11, wherein the power management application monitors header information for packets of information included in data communicated by each of the plurality of applications to determine bandwidth and latency characteristics for each of the plurality of applications.

14. The power management system of claim 11, wherein the power management application monitors content of the data communicated by each of the plurality of applications to determine bandwidth and latency characteristics for each of the plurality of applications.

15. The power management system of claim 11, wherein the power management application monitors type of the data communicated by each of the plurality of applications to determine bandwidth and latency characteristics for each of the plurality of applications.

16. The power management system of claim 11, wherein the power management application monitors bandwidth of the data communicated by each of the plurality of applications to determine bandwidth and latency characteristics for each of the plurality of applications.

17. A method of adjusting communications settings assigned to an application executed on a first device in communication with a second device over a wireless communications connection, the method comprising:

determining a first communications setting assigned to the first application;

monitoring at least one of a bandwidth and latency characteristics for the first application to obtain a first result, when the first application communicates with the second device;

determining a second communications settings for the first application based on the first result; and assigning the second communications setting to the first application instead of the first communications setting, if the second setting is different than the first setting.

18. The method of claim 17, wherein the first result is obtained based on the first application's requirements for at least one of the bandwidth and latency characteristics so that the first application can efficiently communicate with the second device.

19. The method of claim 18 further comprising:

assigning the second communications settings so that the latency is decreased, if the first result indicates that the first application is communicating time-sensitive data.

20. The method of claim 18 further comprising:

assigning the second communications settings so that the bandwidth is increased, if the first result indicates that the first application needs to communicate a larger volume of data.

* * * * *